United States Patent [19]

Cornelissen

[11] Patent Number: 4,904,420
[45] Date of Patent: Feb. 27, 1990

[54] METHOD AND A DEVICE FOR INTRODUCING A GAS INTO A LIQUID

[75] Inventor: Jan Cornelissen, The Hague, Netherlands

[73] Assignee: Pielkenrood Vinitex B.V., Netherlands

[21] Appl. No.: 163,754

[22] PCT Filed: Jun. 18, 1987

[86] PCT No.: PCT/NL87/00012
§ 371 Date: Apr. 1, 1988
§ 102(e) Date: Apr. 1, 1988

[87] PCT Pub. No.: WO87/07886
PCT Pub. Date: Dec. 30, 1987

[30] Foreign Application Priority Data
Jun. 19, 1986 [NL] Netherlands ............. 8601602

[51] Int. Cl.⁴ ................................ B01F 3/04
[52] U.S. Cl. ........................................ 261/92
[58] Field of Search ................................ 261/92

[56] References Cited

U.S. PATENT DOCUMENTS

| | | | |
|---|---|---|---|
| 3,134,826 | 5/1964 | Jalma | 261/92 |
| 3,266,786 | 8/1966 | Grimes et al. | 261/92 |
| 3,348,829 | 10/1967 | Grimes | 261/152 |
| 3,358,422 | 12/1967 | Van Der Schee | 261/92 |
| 3,658,305 | 4/1972 | Newtson | 261/92 |
| 4,101,384 | 7/1978 | Faust et al. | 261/92 |
| 4,468,326 | 8/1984 | Kawert | 261/92 |

FOREIGN PATENT DOCUMENTS 0067028 12/1982 European Pat. Off. .
1178305 5/1959 France .

Primary Examiner—Tim Miles
Attorney, Agent, or Firm—Kenyon & Kenyon

[57] ABSTRACT

A method and device for introducing a gas into a liquid by using a vessel (1) for taking up the liquid, with a paddle assembly (2) rotatable therein having a substantially horizontal axis of rotation, said vessel being partly filled with a liquid (4) and said paddles being driven with such a speed that the liquid is pushed upwards in the sense of rotation, after which the liquid shooting downwards brings about a hydraulic jump (9), and the overturning liquid portion splashing into said hydraulic jump thus introducing gas into the liquid.

10 Claims, 1 Drawing Sheet

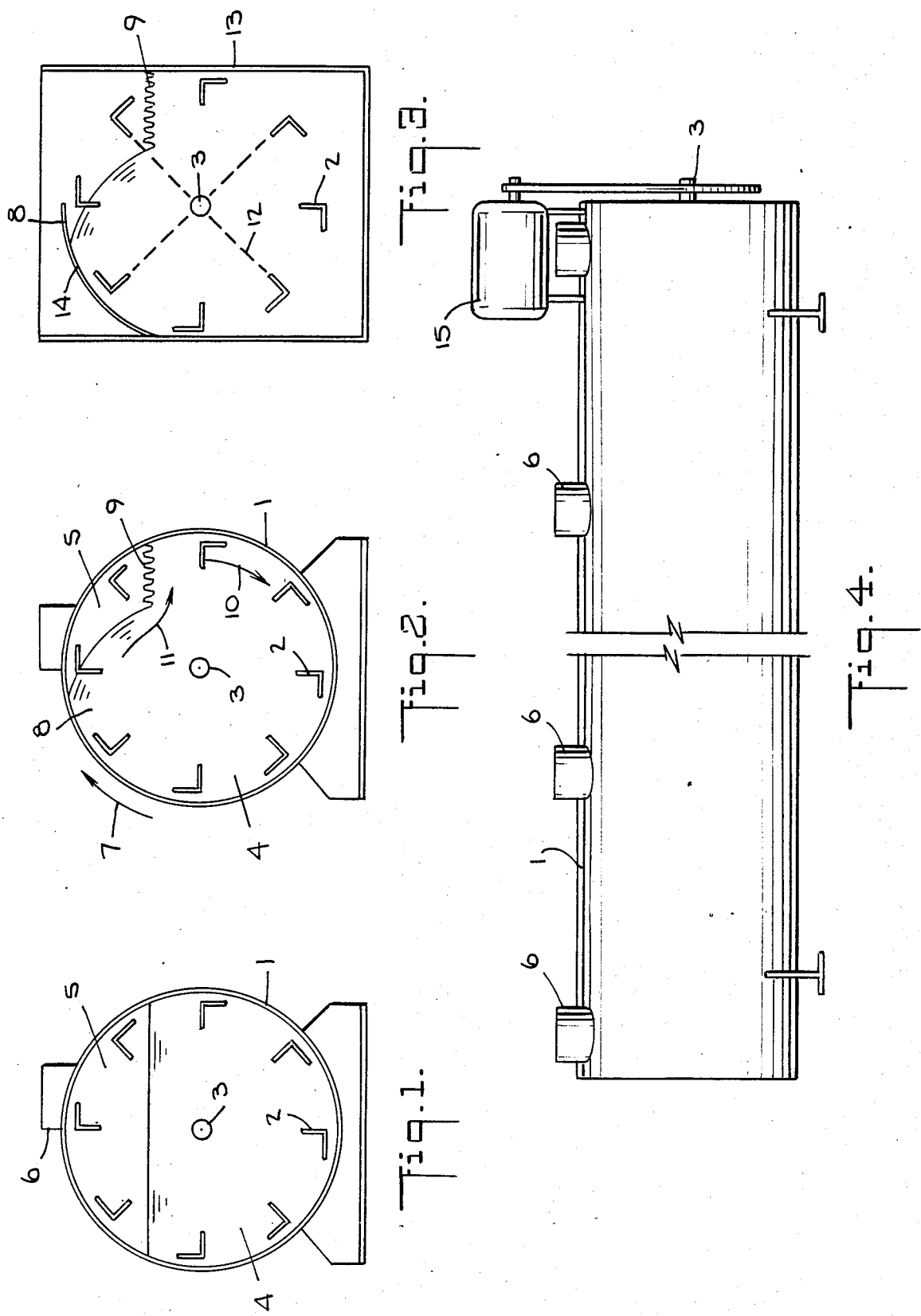

METHOD AND A DEVICE FOR INTRODUCING A GAS INTO A LIQUID

The invention relates to a method and a device for introducing gas into a liquid by using a vessel for taking in the liquid, provided with a revolving paddle assembly with a mainly horizontally rotatable shaft, which paddles are adapted to introduce the gas into the liquid from the gas space above the liquid.

From EP-B 0 005 553 a device is known which is suitable for this purpose, in which scoops which are connected by means of spokes to the rotatable shaft are movable along the inner wall of the partly cylindrical vessel with an open top and through the liquid present therein, a small part of the trajectory thereof leading through the gas space above the liquid. In the upper part of the trajectory the liquid flows from the scoops and through the gas and will, then, absorb gas, and, furthermore, gas is scooped by the scoops into the liquid and will escape in the lower part of the trajectory as gas bubbles. Since said bubbles then arrive in the rearward part of the preceding scoop, a direct escape of the gas towards the liquid surface is prevented. The gas transfer towards the liquid is, however, rather low, since the collected bubbles will easily coalesce again to form a larger gas cushion so that the contact area with the liquid is reduced accordingly. Such a device provides, therefore, a relatively low gas introduction.

The invention aims at providing a method and a device enabling a considerably higher gas introduction into the liquid. To that end the method according to the invention is characterised in that the vessel is partly filled with the liquid, and the paddles are driven at such a speed that the liquid is pushed upwards in the sense of rotation, after which the liquid shooting downwards brings about the formation of a hydraulic jump, and the overturning portion of the liquid splashes down into this jump, thus introducing gas into the liquid.

The paddles moving through this hydraulic jump bring the gas bubbles into the liquid. At a given gas bubble co-centration as many bubbles will leave the liquid as there are introduced. The gas bubbles leave the liquid at the hydraulic jump, which results, there in a violent agitation of the liquid. Thereby a large boundary surface between liquid and gas is obtained.

From aeration experiments with tap water it has appeared that it is possible to introduce more than 5000 mg/l.h oxygen, which is considerably more than is possible with the current devices. An aeration efficiency of about 2.5 kg/kWh oxygen can be obtained thereby.

In addition to dissolving a gas into a liquid, this method can also be used for removing volatile components from a liquid, and then care should be taken that the gas escaping from the liquid with the removed components will be exhausted separately from the gas supply.

If required the introduction of gas into the liquid can be improved by supplying the gas under pressure.

The invention provides a device for the execution of this method, comprising a vessel with a supply and a discharge for the liquid, and a paddle wheel directed along the horizontal axis of this vessel and adapted to introduce gas into the liquid from a gas space situated in said vessel above the liquid, said device being characterised in that the width of the paddles of the paddle wheel, when driving said paddle wheel at the operational velocity, is sufficient for pushing the liquid up to a highest point in a first quadrant where the paddles are moving upwards, but, on the other hand, the outer layer of the liquid splashing downwards in the next quadrant will not enter the paddle ring moving downwards in said quadrant.

In particular the wall of this device is, at least in said first quadrant, sustantially coaxial with the axis of the paddle wheel, and is sitatued at a small distance from the outer edges of the paddles. In this manner the liquid can be driven by the paddles towards the highest point, and thus an optimal effect is obtained.

For an optimal operation a gas space should still be present within the paddle ring afer pushing up the water, which restricts the width of the paddles. On the other hand the width of the paddles should as large as possible in view of the pushing up of the liquid and the introduction of bubbles.

From NL-A 65 08 434 an aeration device is known per se which comprises a cylindrical vessel with a rotatable shaft of a paddle assembly arranged in the longitudinal axis thereof, said paddle assembly bringing the liquid, which completely fills the vessels, into rotation, gas bubbles introduced via said shaft following spiral-shaped bubble paths in which the retention time of the bubbles, in comparison with the straight vertical bubble paths rising in stationary water, is increased. This known device is more complicated than the device according to the invention, i.a. because of the necessity of additional means for supplying the gas under pressure to the hollow shaft.

In particular the vessel of the device according to the invention is provided, at least in the second quadrant of the paddle movement, with a baffle or wall arranged at a small distance of the paddle trajectory, in order to keep the hydraulic jump as small as possible which enhances the introduction of bubbles.

Between at least a part of the paddles, interrupted or perforated plates can be provided which can have a size-reducing effect on the entrained gas bubbles.

Moreover said vessel, at least at its upper side, can be cylindrically shaped, and can be provided, there, with one or more gas supply openings communicating with the second quadrant of the paddle trajectory.

If the device according to the invention is intended for removing volatile components from the liquid, the vessel should be provided with a gas discharge which is separated from the gas supply.

The invention will be elucidated below in more detail by reference to a drawing, showing in:

FIG. 1 a diagrammatic cross-section of a device according to the invention in the condition of rest;

FIG. 2 a cross-section corresponding to FIG. 1 of the device in the active condition;

FIG. 3 a cross-section corresponding to FIG. 2 of an other embodiment; and

FIG. 4 a lateral view of a device according to the invention.

The device shown in the drawing comprises a cylindrical vessel 1, in which a paddle wheel consisting of paddles 2 is arranged around a rotatable shaft 3, which shaft 3 extends along the longitudinal axis of the vessel 1. In the embodiment shown the paddles 2 have an L-shaped section, and are connected with the shaft 3 by means of arms or discs not shown. In the condition of rest according to FIG. 1 the vessel 1 is partly filled with a liquid 4, and above the liquid a gas space 5 is present communicating with one or more gas supply apertures.

If the liquid 4 is to be aerated under normal pressure, the apertures 6 communicate with the ambient air.

When, as shown in FIG. 2, the shaft 3 is brought into rotation as indicated by an arrow 7, the liquid 4 will, at a sufficient rotational velocity, be entrained and be pushed upwards at 8. Under the influence of gravity the liquid after being pushed upwards, will shoot downward, thereby forming a so-called hydraulic jump 9 which extends as far as the side wall of the vessel 1. The liquid is, there, agitated and will be mixed with gas from the space 5, the paddles 2, which are immersed again into the liquid in the area 9, then introducing gas bubbles from the area 9 into the liquid as indicated by an arrow 10. The gas bubbles are being entrained with the turbulent liquid, and escape again as indicated by an arrow 11 towards the area 9, said escaping gas bubbles causing a violent liquid agitation in the area 9.

Because of the gas admixture the level of the area 9 will be about the same as the liquid level in the stationary condition according to FIG. 1. The volume of the gas space 5 is considerably reduced by the liquid 8 pushed upwards in correspondence with the amount of gas taken up by the liquid in the form of bubbles. The larger the gas space 5 is at a stationary paddle wheel, the larger the portion 8 pushed upwards will be, and the more gas bubbles will be introduced into the liquid 4. However, since increasing the gas space 5 involves a reduction of the liquid volume, there will be a given liquid level at which an optimal contact surface between gas and liquid will be reached. A larger gas bubble introduction will, then, no longer outweight the liquid volume reduction.

The paddles 2 should extend in the direction of the shaft 3 over such a distance that the liquid is sufficiently pushed upwards and sufficient gas bubble introduction is brought about. This width is limited by the requirements that for an optimal operation a gas space should still be present within the ring of paddles 2. At a too high velocity or too large width of the paddles, when there is a gas space left only between the paddles, the gas bubble introduction will be reduced.

In order to reduce the size of the gas bubbles entrained with the liquid, a number of perforated plates 12 can be arranged between the paddles as diagrammatically shown in FIG. 3.

By reducing the size of the gas bubbles the gas/liquid contact area will be increased, but then also the area 9 will be agitated less by the escaping gas bubbles. If the gas bubbles are too small, the retention time of the small gas bubbles may become too long. All this depends on the manner in which the device is used.

FIG. 3 shows an other embodiment with a vessel with a rectangular cross-section. A side wall 13 thereof or a corresponding additional baffle defines the area 9 to about the trajectory of the paddles 2, and a curved baffle 14 enhances the upward pushing of the liquid towards the highest point 8.

As appears from FIG. 4, the vessel 1 can be provided for aeration with a plurality of separate supply apertures in order to distribute the air supply.

A motor 15 provides by means of a suitable reduction means the drive of the shaft 3.

Connections not shown serve for supplying and discharging the liquid to be treated, which supply and discharge can also take place in a continuous manner if an operation with a continuous flow is desired. For maintaining the liquid level an overflow baffle or an other level control means can be used.

Such a device can be used for aerating water, e.g. for reducing the chemical oxygen demand (COD) of the water. The oxygen content can be increased 4.5 times by introducing oxygen instead of air into the gas space.

On the other hand said device can also be used for removing volatile components from a liquid, in which case, of course, apart from gas supply apertures 6 also discharge apertures separated therefrom should be present for allowing gas containing said components to be discharged.

If the introduction of gas into the liquid should still be increased, the gas space 5 can, of course, be pressurised.

During experiments with such a device it has appeared that by means of a vessel 1 with a diameter of only 1 m an oxygen introduction in tap water of more than 5000 mg/l.h and with an oxygen introduction efficiency of more than 2.5 kg/kWh can be obtained; this is considerably better than has been possible with the current devices.

The gas introduction is, moreover, directly proportional to the length of the vessel 1, which is only limited by the constructional feasibility, by the available space and the like. Of course several vessels can be arranged in line or side by side.

Such a device can be considered as a contrifugal pump with a low pressure height. The behaviour of the liquid pushed upwards can be compared with a breaking wave, the core of which shooting downwards and causing the formation of the hydraulic jump, and the overturning part splashing down into said jump, thus introducing gas into the liquid.

Such a device is, for instance, suitable for aerating a large water basin, the vessel 1 being submerged to obtain the desired water level, and by providing a water inlet near the shaft 3 at one end of the vessel 1, and an outlet near the circumference at the other end of said vessel, a circulating flow can be brought about.

In the case of aeration at a normal pressure, the vessel 1 can be provided with one continuous aperture 6 freely communicating with the ambient air.

Defining the hydraulic jump area 9 can also be obtained by arranging two paddle wheels 2 side by side in one vessel 1, said wheels being driven in opposite senses, and having adjacent jump areas which, thus, laterally delimit each other. The baffle 13 is then omitted, but for each paddle wheel 2 a curved baffle 14 is to be provided.

I claim:

1. A method for introducing a gas into a liquid by using a vessel for taking in the liquid with a paddle assembly rotatable therein, having a mainly horizontally rotatable shaft, said paddles being adapted to introduce the gas into the liquid from the gas space above the liquid, characterised in that said vessel (1) is partly filled with a liquid (4), and the paddles (2) are driven with such a speed that the liquid is pushed upwards (8) in the sense of rotation, after which the liquid shooting downwards brings about a hydraulic jump (9), and the overturning part of the liquid splashes down into said jump (9) thus introducing a gas into the liquid.

2. The method of claim 1, characterised in that it is used for removing volatile components from the liquid, the gas escaping from the liquid being discharged separately from the gas supply.

3. The method of claim 1 or 2, characterised in that the gas is supplied under pressure.

4. A device for executing the method according to claim 1, comprising a vessel with a liquid supply and discharge and a paddle wheel directed along the horizontal axis of said vessel, and being adapted to introduce gas from a gas space situtated above the liquid surface into said liquid, characterised in that the width of the paddles (2) of the paddle wheel, when driving said paddle wheel at the operational velocity, is sufficient for pushing the liquid (4), in the first quadrant where the paddles (2) are moving upwards, towards a highest point (8), but, on the other hand, the outer layer of the liquid pushing downwards on the next quadrant will not enter the ring of paddles (2) moving downwards in the latter quadrant.

5. The deice of claim 4, characterised in that a wall (14) of the vessel (1) is, at least in said first quadrant, substantially coaxial with the shaft (3) of the paddle wheel (2, 3).

6. The device of claim 4 or 5, characterised in that at least at the end of the next quadrant of the paddle movement following said first quadrant, the vessel (1) is provided with a baffle or wall (13) at a small distance of the paddle trajectory.

7. The device of claims 4 or 5, characterised in that between the paddles (2) and the shaft (3) interrupted or perforated plates (12) are provided.

8. The device of claim 4, characterised in that the vessel (1), at least at its upperside, is cylindrically shaped, and is, there, provided with one or more gas supply apertures (6) communicating with said second quadrant of the trajectory of the paddles (2).

9. The device of any one of claims 4, 5 or 8, characterised in that it is intended for removing volatile components from a liquid, and is provided with a gas discharge which is separated from the gas supply (6).

10. The device of any one of claims 4, 5 or 8, characterised by two paddle wheels to be rotated in opposite senses, which are arranged side by side in one vessel (1) in such a manner that the hydraulic jump areas (9) thereof are adjacent.

* * * * *